(12) United States Patent
Ringer

(10) Patent No.: US 6,357,467 B1
(45) Date of Patent: Mar. 19, 2002

(54) AUTOMATIC WATER SUPPLY SHUTOFF VALVE

(75) Inventor: Yoram Ringer, Providence, RI (US)

(73) Assignee: Grinnell Corporation, Cranston, RI (US)

( * ) Notice: Subject to any disclaimer, the term of this patent is extended or adjusted under 35 U.S.C. 154(b) by 0 days.

(21) Appl. No.: 09/535,607

(22) Filed: Mar. 27, 2000

(51) Int. Cl.$^7$ ............................................. F16K 11/02
(52) U.S. Cl. ............................ 137/119.01; 137/119.06; 137/119.08
(58) Field of Search ..................... 137/115.05, 115.15, 137/119.01, 119.06, 119.08

(56) References Cited

U.S. PATENT DOCUMENTS

| | | | |
|---|---|---|---|
| 2,203,138 A | 6/1940 | Ginnaty | |
| 2,265,810 A | 12/1941 | Lowe et al. | |
| 2,266,421 A | 12/1941 | Griffith | |
| 3,559,670 A | 2/1971 | Yedidiah | |
| 4,243,064 A | 1/1981 | Nolte | |
| 4,385,640 A | 5/1983 | Iverson | |
| 4,638,831 A | 1/1987 | Lindgren | |
| 4,798,221 A | 1/1989 | Crawford et al. | |
| 5,172,716 A | * 12/1992 | Paptzun | .................. 137/115.05 |
| 5,236,002 A | 8/1993 | Martin et al. | |

FOREIGN PATENT DOCUMENTS

| | | | | |
|---|---|---|---|---|
| DE | 2519026 | * | 7/1975 | ............ 137/119.08 |

OTHER PUBLICATIONS

Grinnell Brochure; "Residential Domestic Shutoff Valve, Automatic" Model F540, 1 Inch (25mm); 5pp.; Printed in U.S.A. 9–93.

Report on Residential Automatic Domestic Water Shutoff Valve, Grinnell, Cranston, RI; Feb. 2, 1994; File Ex4538; Project 93NK8128; Copyright 1994 Underwriters Laboratories Inc.; 10 pp.

Report on Residential Automatic Domestic Water Shutoff, Grinnell Corp., Cranston, RI; Mar. 5, 1999; File Ex4538; Project 98NK26150 (Ex5209) Project 99BA524027; Copyright 1999 Underwriters Laboratories Inc.; 14 pp.

Grinnell Brochure; "Residential Domestic Shutoff Valve, Automatic" model F540, 2 Inch (50mm); 6pp; Printed in U.S.A. 5–99.

* cited by examiner

Primary Examiner—Stephen M. Hepperle
(74) Attorney, Agent, or Firm—Fish & Richardson P.C.

(57) ABSTRACT

An automatic water supply shutoff valve for use with a fire protection piping system has a body defining a cavity communicating among a supply inlet connected to a water supply, an ancillary outlet connected to ancillary piping, and a fire protection outlet connected to fire protection piping; and a piston within the cavity defining a piston passageway. The piston moves between a first position connecting the supply inlet and ancillary outlet and a second position connecting the supply inlet and fire protection outlet. The piston moves in response to biasing forces acting against the piston, including a first biasing force from the supply inlet, a second biasing force from the fire protection outlet, and a third biasing force. The first biasing force, urging the piston toward its second or fire protection position, is opposed by a combination of the second and third biasing forces, together urging the piston toward its first or ancillary position. The piston has an inlet communicating between the supply inlet and piston passageway, and a plurality of radial piston outlets, which, in first position, communicate between the piston passageway and ancillary outlet, and which, in second position, communicate between the piston passageway and fire protection outlet.

23 Claims, 6 Drawing Sheets

AUTOMATIC WATER SUPPLY SHUTOFF VALVE

TECHNICAL FIELD

This invention relates to automatic shutoff valves in residential combined ancillary or domestic and fire sprinkler piping systems.

BACKGROUND

Residential domestic shutoff valves are used in dual-purpose residential water supply piping systems serving both the domestic and residential fire protection sprinkler system needs under NFPA ("National Fire Protection Association") 13D or NFPA 13R, the complete disclosures of which are incorporated herein by reference. When an automatic fire sprinkler operates, the residential domestic shutoff valve automatically shuts off water flow to the domestic system and diverts the available water supply to the fire sprinkler system. Consequently, when the residential domestic shutoff valve is utilized, the system designer need not add the domestic flow demand to the fire sprinkler system flow demand, as would otherwise be required by NFPA 13D or NFPA 13R.

Use of a residential domestic shutoff valve may be considered when the water supply cannot adequately provide for both the domestic design demand and fire sprinkler flow demand, or when it is desirable to increase the effectiveness of the fire sprinkler system by automatically shutting off domestic flow. A typical domestic water supply shutoff valve for use with a fire protection system water supply piping is described in Martin et al. U.S. Pat. No. 5,236,002, also owned by the present assignee.

SUMMARY

According to the invention, an automatic water supply shutoff valve for use in connection with fire protection water supply piping system comprises a valve body defining a cavity in communication among a supply inlet for connection to a supply of water, a first, ancillary outlet for connection to ancillary supply piping, and a second, fire protection outlet for connection to fire protection piping; and a piston disposed within the cavity and defining a piston passageway, the piston being mounted for movement between a first position with the piston passageway connecting the supply inlet with the first, ancillary outlet, for flow of water therebetween, and a second position with the piston passageway connecting the supply inlet with the second, fire protection outlet, for flow of water therebetween, movement of the piston between the first position and the second position being responsive to biasing forces acting against the piston, the biasing forces comprising a first biasing force from the supply inlet acting over a first surface area of the piston, a second biasing force from the fire protection outlet acting over a second surface area of the piston, and a third biasing force acting against the piston, the first biasing force, urging the piston toward its second position, being opposed by a combination of the second biasing force and the third biasing force, together urging the piston toward its first position, the piston defining a piston inlet in communication between the supply inlet and the piston passageway and a plurality of radial piston outlets in the first position in communication between the piston passageway and the first, ancillary outlet and in the second position in communication between the piston passageway and the second, fire protection outlet.

Preferred embodiments of the invention may include one or more of the following additional features. The third biasing force comprises gravity, and/or the valve comprises a compression spring engaged between the piston and the body, and the third biasing force comprises a spring force applied against the piston by the compression spring. The valve further comprises means for restricting flow between the first, ancillary outlet and the second, fire protection outlet. The first surface area of the piston and the second surface area of the piston are substantially equal. Preferably the piston has a cylindrical shape and the first surface area and/or the second surface area of the piston is equal to or greater than a cross-sectional area of the piston taken on a plane perpendicular to the axis of the piston. The first direction of movement of the piston and the second direction of movement of the piston are opposite directions along a cylindrical axis of the piston. An interconnecting passageway between the first, ancillary outlet and the second, fire protection outlet is defined between an outer surface of the piston and an opposed inner surface of the valve body. Flow of water through the interconnecting passageway is restricted by at least a minimum clearance between the outer surface of the piston and the opposed inner surface of the valve body, the minimum surface being relatively small compared to the areas of the first, ancillary outlet and the second, fire protection outlet. The minimum clearance extends along the axis of the piston in a region of a fixed distance equal to or greater than the axial length of the radial piston outlets. The piston is disposed for movement to an intermediate position, between the first position and the second position, for resisting flow from the supply inlet toward the first, ancillary outlet and for resisting flow from the supply inlet toward the second, fire protection outlet, and, the minimum clearance, with the piston in the intermediate position and the radial piston outlets positioned within the region of fixed distance, resists flow from the radial piston outlets toward the first, ancillary outlet and toward the second, fire protection outlet. Preferably, flow of water through the interconnecting passageway is restricted by a first annular seal, and, more preferably, by first and second annular seals, engaged between the outer surface of the piston and the opposed inner surface of the valve body. The first and second annular seals are spaced apart along the axis of the piston and defining a region of fixed distance equal to or greater than the axial length of the radial piston outlets. The piston is disposed for movement to an intermediate position, between the first position and the second position, for resisting flow from the supply inlet toward the first, ancillary outlet and for resisting flow from the supply inlet toward the second, fire protection outlet, and the first annular seal and the second annular seal cooperate, with the piston in the intermediate position and the radial piston outlets positioned between the first annular seal and the second annular seal and within the region of fixed distance, to resist flow from the radial piston outlets toward the first, ancillary outlet and toward the second, fire protection outlet. The annular seals comprise u-shape seals. The fire protection outlet is connected to a fire protection sprinkler piping system with one or more fire protection sprinklers, the fire sprinkler fire protection piping system having a standby (static) condition closed to flow from fire protection outlet and an active condition open to flow from the fire protection outlet, the active condition providing a flow from the fire protection outlet. Preferably, the piston is responsive to change of the fire protection sprinkler piping system from the static condition to the active condition to move from the first position toward the second position, e.g., reduced pressure in the fire sprinkler piping system resulting from a single sprinkler flow reduces the second biasing force allowing the piston to move toward the second position. The piston returns to the first position when the fire protection sprinkler piping system returns to the static condition. The piston and the body, in the first position of the piston, together define a first generally circumferential ancillary flow passageway in communication between the plurality of radial piston outlets and the ancillary outlet, and the piston and the body, in the second position of the piston, together define a second generally circumferential fire protection flow passageway in communication between the plurality of radial piston outlets and the fire protection outlet. The piston moves from the first position toward the second position in response to a differential of pressure between the supply inlet and the fire protection outlet of approximately 2 psi minus the weight of the piston.

Advantages of the residential domestic automatic shutoff valve of the invention include a built-in check valve in the fire protection outlet that eliminates the need for a separate check valve. Also, the residential domestic automatic shutoff valve of the invention automatically resets, thereby eliminating the need for valve disassembly after a fire protection sprinkler piping system test or operation. The residential domestic shutoff valve of the invention maximizes the effective use of an existing water supply and therefore, in areas with limited water supplies, it may eliminate the necessity of adding costly pumps, pressurized reservoirs, or electrically operated domestic shutoff valves.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
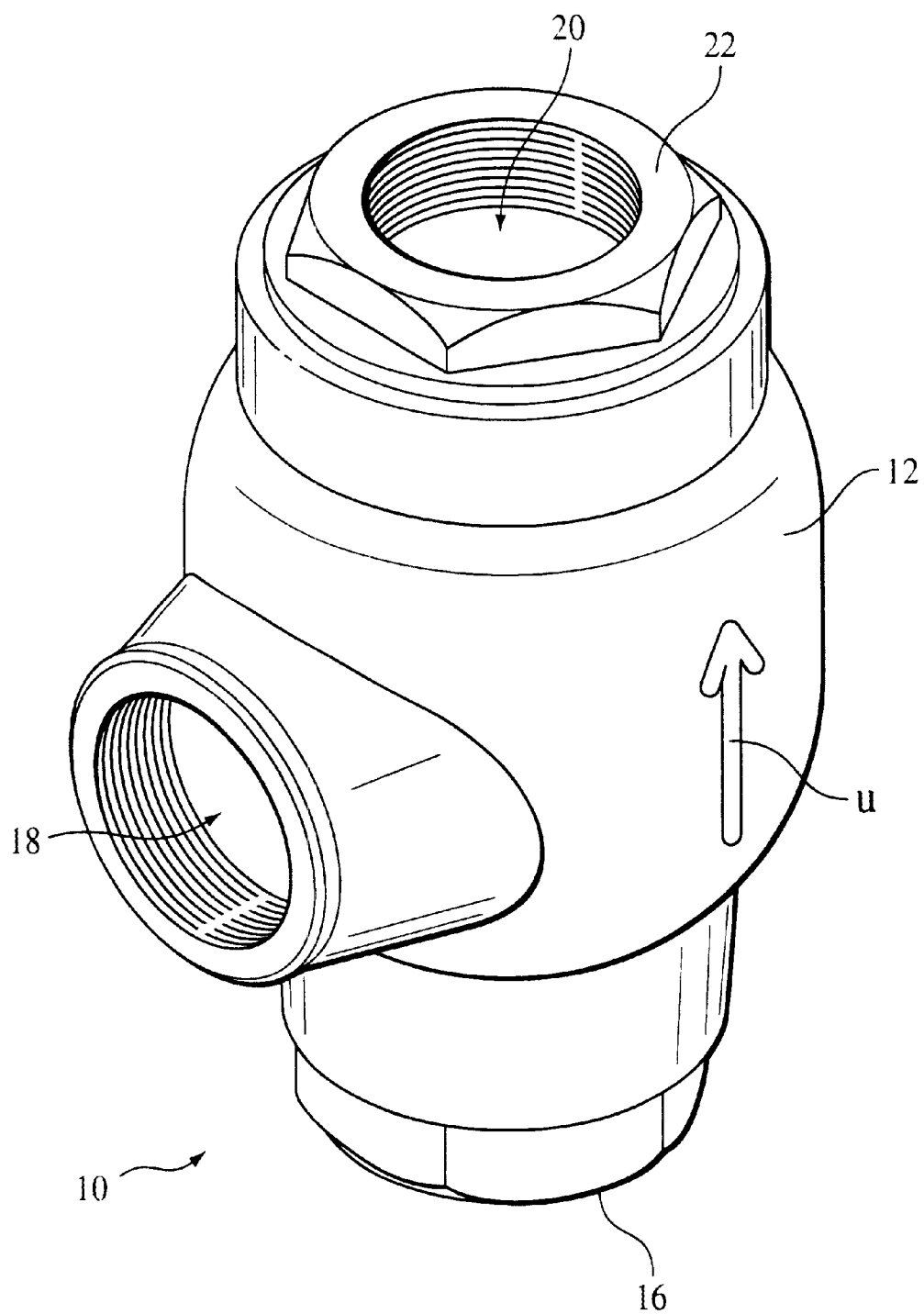
FIG. 1 is a side elevation view of a residential domestic automatic shutoff valve of the invention.
Figure 2:
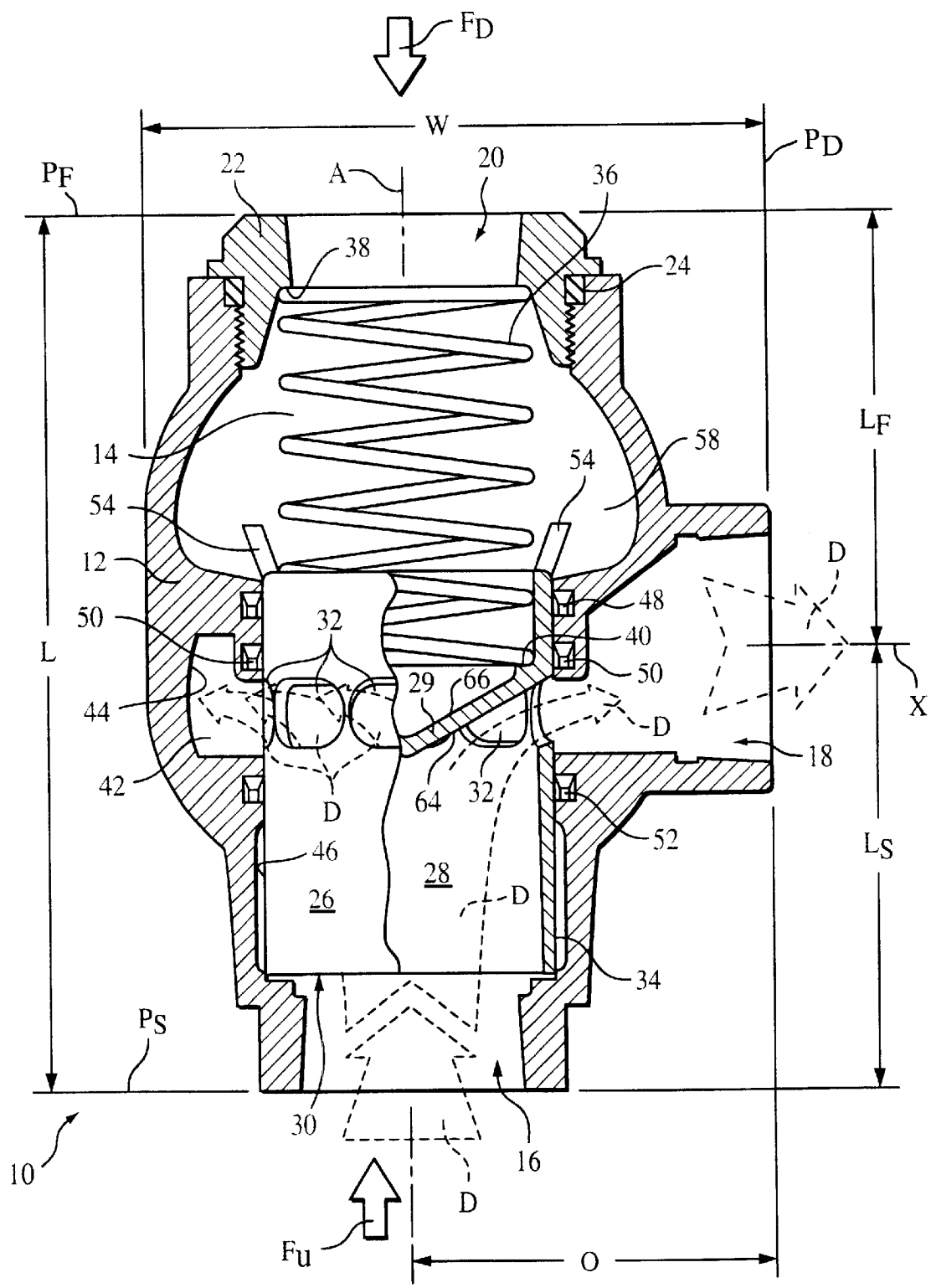
FIG. 2 is a side plan view, partially in section, of the residential domestic automatic shutoff valve of FIG. 1, with the piston in its down or lower position, allowing flow of water from the supply inlet toward the domestic outlet and restricting flow of water toward the fire protection outlet.
Figure 3:
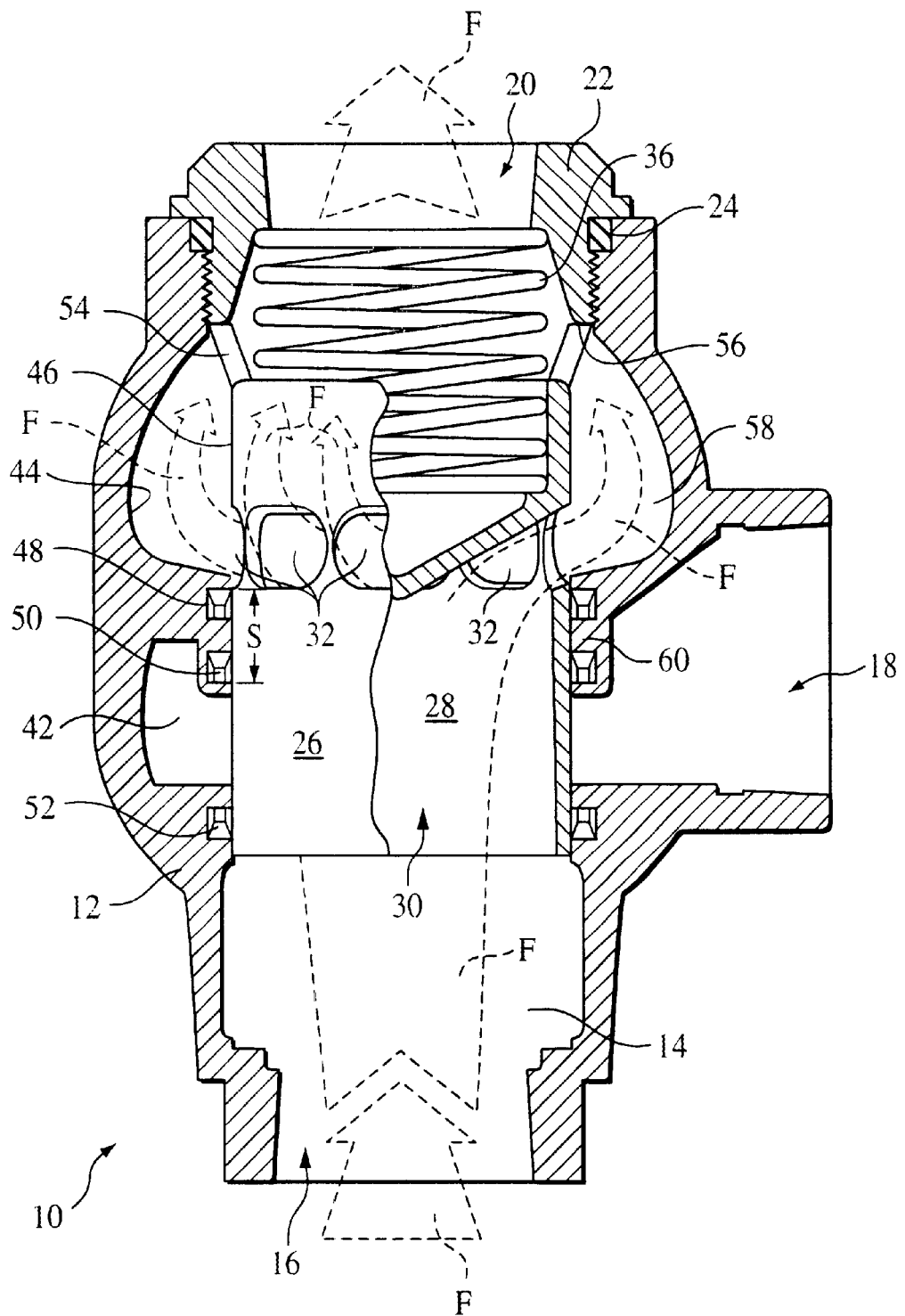
FIG. 3 is a side plan view, partially in section, of the residential domestic automatic shutoff valve of FIG. 1, similar to FIG. 2, but with the piston in its up or upper position, allowing flow of water from the supply inlet toward the fire protection outlet and restricting flow of water toward the domestic outlet.

Referring to FIGS. 1–5, a residential domestic automatic shutoff valve 10 of the invention has a body 12 defining a body cavity or passageway 14 communicating among a water supply inlet 16, a first or domestic (ancillary) outlet 18, and a second or fire protection outlet 20. The residential automatic shutoff valve 10 is installed vertically with the water supply inlet 16 at the bottom, the fire protection outlet 20 at the top, and the domestic outlet 18 at the side. A removable cover 22 is mounted in threaded engagement with the body 12 at the fire protection outlet 20, with the interface sealed by o-ring 24. A generally cylindrical piston 26 (also shown separately in FIG. 5) is disposed within the body passageway 14 for movement along a cylindrical piston axis, A, as described more fully below. The piston 26 defines a piston passageway 28 communicating between an axial piston inlet 30 and a plurality, e.g., eight are shown, of radial piston outlets 32 spaced from the piston inlet 30 along the axis, A, and arranged circumferentially about the piston wall 34. The piston passageway 28 terminates axially in a wall 29 defining a first surface 64 against which a first biasing force, $F_U$, is applied by water pressure from the supply inlet 16, urging the piston 26 toward its second or fire protection position (FIG. 3). In the preferred embodiment, the first surface 64 is a convex, conical surface, disposed at an acute angle, C (FIG. 5), e.g. 30°, to a plane at right angle to the piston cylindrical axis, A.

In FIG. 2, the piston 26 is shown in its first (down or lower) position, urged by a generally downwardly-directed force (arrow, $F_D$) applied, in part, by water pressure from the fire protection sprinkler piping system 104 (FIG. 6), as discussed more fully below. The downwardly directed force, $F_D$, is also applied, in part, by gravity and by compression spring 36 engaged between a spring shoulder 38 defined by the cover 22 in a region about the fire protection outlet 20, and a shoulder surface 40 defined by the piston 26. In the down or lower position of the piston 26, the piston radial outlets 32 are in communication with a first circumferential domestic flow passageway 42 defined between the opposed surfaces 44, 46 of the valve body 12 and the piston 26, respectively, in the region of (i.e., generally in a plane with) the radial piston outlets 32 and communicating with the domestic outlet 18, permitting flow of water from the supply inlet 16 toward the domestic outlet 18 (arrows, D). Fire protection line seals 48, 50 and domestic line seal 52 restrict leakage past the piston 26, along the valve body wall inner wall surface 44. The wall 29 axially terminating the piston passageway 28 also defines a second surface 66 against which a second biasing force (a component, with a third biasing force applied by gravity and/or compression spring 36, of force, $F_D$) is applied by water pressure from the fire protection piping system 104 (FIG. 6) acting through the fire protection outlet 20, urging the piston 26 toward its first or domestic position (FIG. 2). In the preferred embodiment, the second surface 66 is a concave, conical surface, also disposed at angle, C (FIG. 5), e.g. 30°, to a plane at right angle to the piston cylindrical axis, A. Each of the first and second surfaces 64, 66, respectively, of the end wall 29 of the piston passageway 28, has a surface area equal to, or preferably greater than, a cross-sectional area of piston taken on a plane perpendicular to the axis, A, of the piston, with the surface areas of the first and second surfaces 64, 66 being substantially equal.

Referring next to FIG. 3, the piston 26 is shown moved to its second (up or upper) position, urged by a generally upwardly-directed force (arrow, $F_U$) applied by water pressure from the supply inlet 16, overcoming the biasing force, $F_D$, of the spring 36 (and also gravity and water pressure from the fire protection piping system 104 (FIG. 6)), with the piston mechanical stop arms 54 (seen most clearly in FIG.

5) engaged upon a stop surface 56 defined by the cover 22 in the region of the fire protection outlet 20. In the up or upper position of the piston 26, the piston radial outlets 32 are in communication with a second generally circumferential fire protection flow passageway 58 defined between opposed surfaces 44, 46, of an upper region of the valve body 10 and the piston 26, connecting the piston radial outlets 32 with the fire protection outlet 20, permitting flow of water from the supply inlet 16 toward the fire protection outlet 20 (arrows, F). The fire protection line seals 48, 50, respectively, toward the domestic outlet 18 once again restrict leakage past the piston 26 through the interconnecting passageway 60 between the opposed wall surfaces 44, 46 of the valve body 12 and the piston 26. The domestic line seal 52 restricts leakage from the supply inlet 16 toward the domestic outlet 18.

Figure 4:
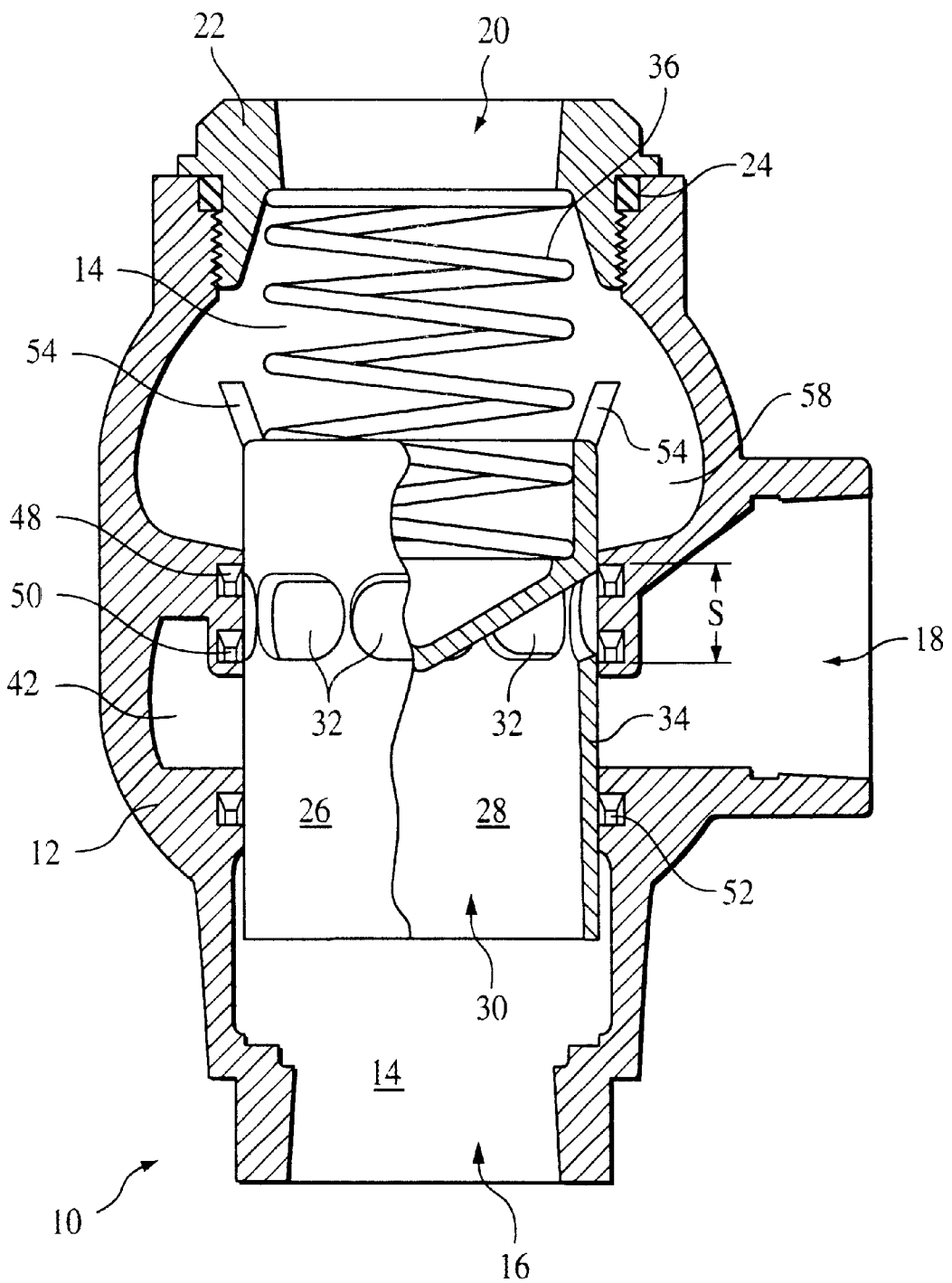
FIG. 4 is a side plan view, partially in section, of the residential domestic automatic shutoff valve of FIG. 1, similar to FIGS. 2 and 3, but with the piston in its intermediate position, between its lower position (FIG. 2) and its upper position (FIG. 3), restricting flow of water toward both the domestic outlet and the fire protection outlet.
Figure 5:
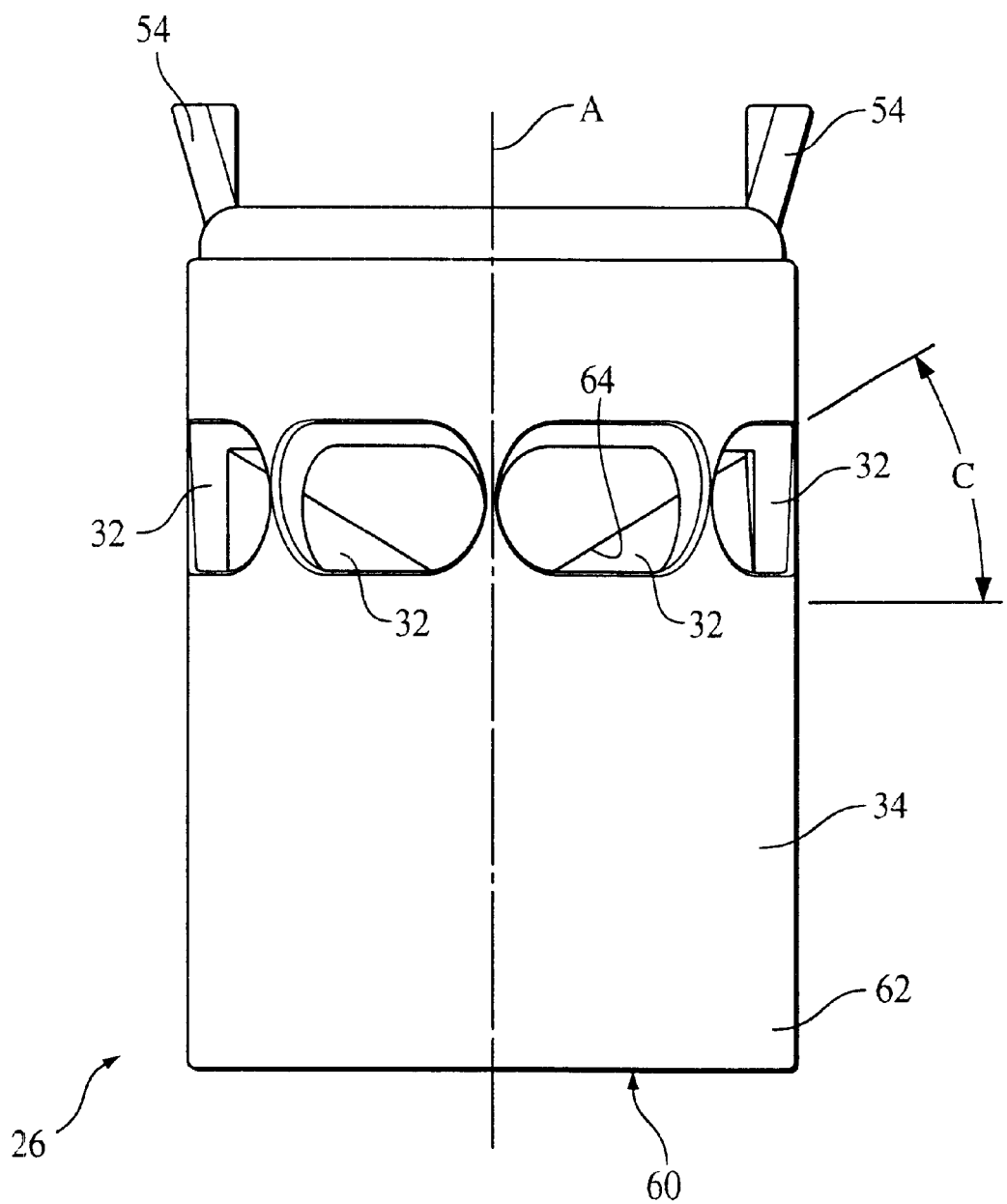
FIG. 5 is a side view of the piston of the residential domestic automatic shutoff valve of FIG. 1.

Referring to FIG. 4, the piston 26 is shown in an intermediate position, between its down or lower position (FIG. 2), for flow of water from the supply inlet 16 toward the domestic outlet 18, and its up or upper position (FIG. 3), for flow of water from the supply inlet 16 toward the fire protection outlet 20. In the intermediate position of the piston 26, flow or leakage from the piston radial outlets 32 toward either of the domestic outlet 18 or the fire protection outlet 20 is restricted by the fire protection line seals 48, 50 which are spaced apart axially at a distance, S, selected to bridge the axial length of the piston radial outlets 32, e.g. about 0.63 inch. The domestic line seal 52 also restricts leakage.

A residential domestic automatic shutoff valve 10 of the invention is embodied in a commercial product available from Grinnell Corporation, of Exeter, N.H., under the designation "Model 540 residential domestic shutoff valve, automatic." By way of example only, the valve body 12 and the cover 22 are formed of bronze per ASTM B62 (C83600 or C84400). The piston 26 is also formed of bronze per ASTM B62 (C83600 or C84400), and the piston outer wall surface 46 has a coating 62, with a thickness of, e.g., 0.001 inches, of baked TEFLON® (TEFLON® is a registered trademark of E.I. du Pont de Nemours & Company, Inc., Wilmington, Del., for poly-tetra-fluoroethylene (PTFE) low friction synthetic resin material). The compression spring 36 is formed from stainless steel wire (UNS S30200). The annular fire protection line seals 48, 50 and the domestic line seal 52 are silicone U-rings, e.g. Parker Number 8406-0300, and the o-ring seal 24 is Buna-N 70 Durometer, e.g. Parker Number 339. The nominal two inches (50 mm) Model F540 residential domestic automatic shutoff valve 10 is rated for use at a maximum service pressure of 175 psi (12.1 bar). The valve body 12 has a length, L, e.g., about 9 3/16 inches (233.4 mm), between a plane, $P_S$, of the supply inlet 16 and a plane, $P_F$, of the second or fire protection outlet 20, a body width, W, e.g., about 5 3/8 inches (136.5 mm), and a radial offset, O, e.g., about 3 3/4 inches (95.3 mm), between a plane, $P_D$, of the first or domestic outlet 18 and the cylindrical axis, A, of the piston 26. The axis, X, of the first or domestic port 18 is spaced from the plane, $P_S$, of the supply inlet by a distance, $L_S$, e.g., about 4 9/16 inches (115.9 mm), and spaced from the plane, $P_F$, of the second or fire protection outlet 20 by a distance, $L_F$, e.g., about 4 5/8 inches (117.5 mm). The supply inlet 16, the first or domestic outlet 18, and the second or fire protection outlet 20 are NPT pipe thread connections threaded per ANSI Standard B1.20.1, for 2 inch nominal piping, rated for 175 psig.

Figure 6:
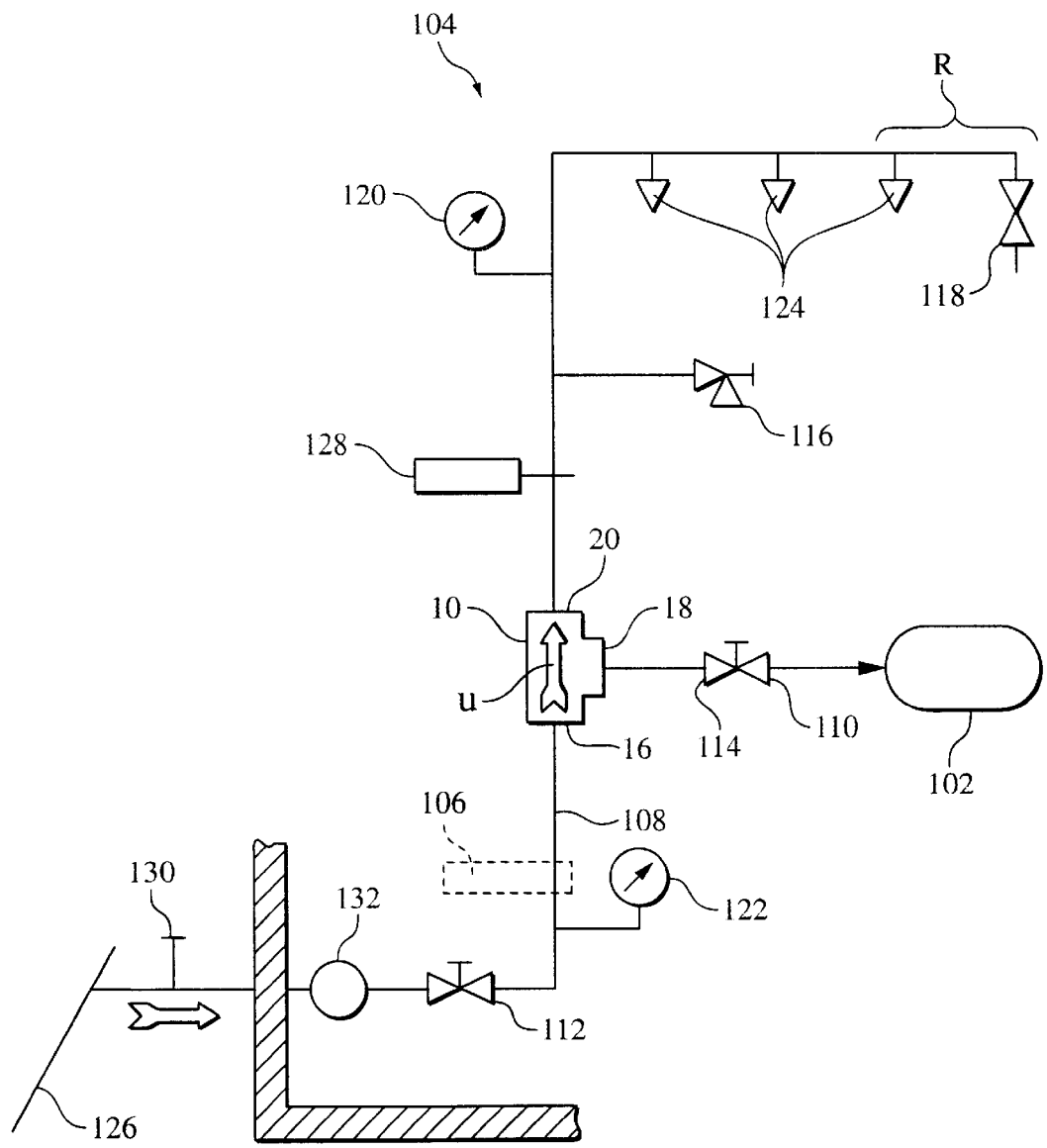
FIG. 6 is a somewhat diagrammatic view of a typical arrangement of a dual-purpose residential water supply piping system serving both the domestic piping system and residential fire protection sprinkler piping system needs under NFPA 13D or NFPA 13R using a residential domestic automatic shutoff valve of the invention.

Referring now to FIG. 6, a typical arrangement 100 of dual systems of domestic piping 102 and fire protection sprinkler piping 104 using the residential domestic automatic shutoff valve 10 of the invention is shown. The arrangement may be modified to meet the requirements of the authority having jurisdiction. The residential domestic automatic shutoff valve 10 is installed vertically (in the direction of arrow, U, cast on the outer surface of the valve body 12 (FIG. 1)) with the supply inlet 16 at the bottom, the fire protection outlet 20 at the top, and the domestic outlet 18 at the side. A suitable clamp 106 may be installed along the water supply riser piping 108 to provide support of the weight of the valve.

A domestic control valve 110 is located between the residential domestic automatic shutoff valve 10 and the domestic piping system 102. The supply inlet 114 to the domestic control valve 110 is preferably located within 12 inches of the domestic outlet 18 of the residential domestic automatic shutoff valve 10.

The drain and flow test connection 116 must be minimum ½ inch for systems per NFPA 13D or minimum 1 inch size for systems per NFPA 13R. The water supply to the residential domestic automatic shutoff valve 10 must be free of contaminants and particles of a size greater than 1/8 inch (3.2 mm). A water supply gate valve 130 and a water meter 132 are typically provided at the supply side of the main control valve 112.

An inspector's test connection 118, with a test orifice equal to the smallest K-factor sprinkler in the fire protection piping system 104, is located at the most hydraulically demanding location in the system (usually adjacent to the fire protection sprinkler 124 at the highest and most remote sprinkler location, R).

Pipe thread sealant is applied sparingly only to the 2 inch NPT male pipe threads which are to be assembled to the three ports (supply inlet 16, domestic outlet 18, and fire protection outlet 20) of the residential domestic automatic shutoff valve 10. The use of a TEFLON® based pipe thread sealant is recommended.

The following steps are performed when initially filling the fire protection piping system 104 and the domestic piping system 102 with water, or after a fire sprinkler operation:

1. Close the main control valve 112.
2. Close the domestic control valve 110 and all water outlets in the domestic piping system 102.
3. Close all drain valves in addition to the drain and flow test connection 116 in the fire protection sprinkler piping system 104, and replace all operated sprinklers 124 as necessary.
4. Partially open the main control valve 112 until the sound of flowing water just begins, and then leave the main control valve 112 in the partially open position.
5. After the fire protection sprinkler piping system pressure gauge 120 indicates approximately the same pressure as the supply pressure gauge 122, fully open the main control valve 112.
6. Open the inspector's test connection 118. After trapped air has been relieved, close the inspector's test connection 118.
7. Open the highest elevation outlet (not shown) on the domestic piping system 102.
8. Partially open the domestic control valve 110 until the sound of flowing water begins. Allow the domestic piping system 102 to slowly fill with water.
9. Close the highest elevation water outlet on the domestic piping system 102 when unaerated water begins to flow.

10. Completely open the domestic control valve 110, and then check that the domestic piping system 102 is properly pressurized by verifying that at least three water outlets in the domestic piping system can flow full at the same time.

If the domestic water outlets flow full, the residential domestic automatic shutoff valve 10 is set and ready for service, and the water outlets on the domestic piping system 102 may be closed.

If the domestic water outlets do not flow full, re-close the domestic control valve 110, wait a minimum of five seconds, and ensure that there is no flow from the fire protection sprinkler piping system 104. Re-open the domestic control valve 110 and then recheck that the domestic water outlets are flowing full.

We refer now again to FIGS. 2–4 and 6. In FIG. 2, the residential domestic automatic shutoff valve 10 is in the normal standby position, with the piston 26, assisted by the compression spring 36, gravity and/or fire protection sprinkler piping system pressure, $F_D$, in the down or lower position. In the down position of the piston 26, water from the supply inlet 16 is directed to flow through the piston inlet 30 into the piston passageway 28 and through the radial piston outlets 32 into the first circumferential domestic flow passageway 42, and then toward the domestic outlet 18. With the piston in its down position, the fire protection line seals 48, 50 permit the residential domestic automatic shutoff valve 10 to perform as a conventional check valve. Also, with the piston 26 in its down position, water is available on demand to the domestic piping system 102 through the domestic outlet 18. Domestic line seal 52 restricts leakage from the supply inlet 16 toward the domestic outlet 18, and fire protection line seals 48, 50, restrict leakage toward the fire protection outlet.

In order for the residential domestic automatic shutoff valve 10 to operate automatically once a fire protection sprinkler 124 is actuated, the fire protection sprinkler system 104 from the water supply main 126 to the fire protection sprinkler system 124 at the most hydraulically remote location, R, is designed to provide a predetermined minimum single sprinkler flow, e.g. 5 gallons per minute ("gpm") (19 liters per minute ("lpm")), when the water supply pressure at the water supply main 126 is at its minimum expected value. The predetermined minimum single fire protection sprinkler flow rate (e.g., 5 gpm (19 lpm)) required for use with the residential domestic automatic shutoff valve 10 does not take precedence over any more hydraulically demanding single or multiple sprinkler flow rates specified for the residential sprinklers being utilized.

If there is operation of one or more fire protection sprinklers 124 during domestic usage, the flow of water from the fire protection sprinkler 124 results in a reduction in fire protection sprinkler piping system pressure, $F_D$, thus allowing the piston 26 to move from its first or domestic position (FIG. 2) toward its second or fire protection position (FIG. 3). For example, in a preferred embodiment, the piston moves from its first position toward its second position in response to a differential of pressure between the supply inlet and the first, fire protection outlet of approximately 2 psi minus the weight of the piston.

In the preferred embodiment of the residential domestic automatic shutoff valve 10 of the invention, the piston 26, moving from its first position toward its second position, moves through an intermediate position (FIG. 4), where the radial piston outlets 32 are positioned in a fixed distance region between the annular fire protection line seals 48, 50, these line seals being spaced apart by a fixed distance, S, equal to or greater than the axial length of the radial piston outlets 32, thereby to restrict flow of water toward both the domestic outlet 18 and toward the fire protection outlet 20. While the piston 26 is in its intermediate position, all of the force, $F_S$, of water pressure from the supply inlet 16 is applied against the first (convex conical) surface 62 of the piston 26, thereby to urge the piston 26 toward its second or fire protection position with maximum available force, by resisting leakage of the supply pressure toward the domestic outlet 18 and toward the fire protection outlet 20.

In this manner, the residential domestic shutoff valve 10 of the invention automatically shuts off flow to the domestic piping system 102 and diverts the available water supply, first, with the piston in its intermediate position (FIG. 4), to urge the piston 26 toward its fire protection position, then, with the piston in its fire protection position (FIG. 3), to flow to the fire protection sprinkler piping system 104. The lower flow into the fire protection sprinkler piping system 104 that might otherwise be caused by possible significant domestic water usage is thus eliminated.

Upon operation of one or more fire protection sprinklers 124, with a predetermined minimum water flow (e.g., 5 gpm (19 lpm)) to the automatic residential fire sprinkler piping system 104, the piston 26 moves upward, into its up or upper position, until the piston mechanical stop arms 54 engage on the stop surfaces 56 (FIG. 3). With the piston 26 in its upper position, water flow diverted from the domestic outlet 18 is directed to flow from the supply inlet 16 through the piston inlet 30 into the piston passageway 28 and through the radial piston outlets 32 into the second circumferential fire protection flow passageway 58, and then toward the fire protection outlet 20. Domestic line seal 52 restricts leakage from the supply inlet 16 toward the domestic outlet 18, and fire protection line seals 48, 50, restrict leakage from the fire protection outlet toward the domestic outlet.

The contours of the piston 26 are specifically configured to minimize upward movement except under the level of sustained flow to the fire protection sprinkler piping system 104 resulting from operation of one or more fire protection sprinklers 124. Most fire protection sprinkler piping systems contain air pockets, so the piston 26 will tend to move momentarily upward if there is a surge in supply pressure. The momentary opening and re-closing of the piston 26 at the fire protection line seals 48, 50 will trap a portion of the pressure increase within the fire protection sprinkler piping system 104. This trapping of pressure increases within the fire protection sprinkler piping system 104 will help to reduce the possibility of a subsequent surge in the supply pressure causing the water flow detector 128 to signal a false alarm.

As indicated above, use of domestic piping system 102 may reduce the pressure available to the fire protection sprinkler piping system 104. However, when utilizing the residential domestic automatic shutoff valve 10 of the invention, it is not necessary to take into account the complex hydraulic modeling of the domestic piping system 102 that would otherwise be required to determine the minimum possible residual (flowing) pressure that would be available to the fire protection sprinkler piping system 104.

For operation of the residential domestic automatic shutoff valve 10 of the invention, it is only necessary to design the fire protection sprinkler piping system 104, from the water supply main 126 to the fire protection sprinkler 124 at the most hydraulically remote location, R, to provide a predetermined minimum single sprinkler flow (e.g., 5 gpm (19 lpm), when the supply pressure at the main 126 is at its minimum expected value). Actual sprinkler demand for the fire protection sprinkler 124 at the most hydraulically remote location, R, should be in accordance with the manufacturer's minimum acceptable flow and pressure, but in the preferred embodiment, the minimum flow must be at least 5 gpm (19 lpm).

Operation of the residential domestic automatic shutoff valve 10 of the invention is tested by the following procedure:

1. Fully open any three water outlets in the domestic piping system 102.
2. Open the inspector's test connection 118 of the fire protection sprinkler piping system 104, to simulate operation of a fire protection sprinkler 124.
3. Verify that the fire alarm 128 is operating and that the flow from the domestic water outlets has decreased to a trickle.
4. Close the domestic control valve 110.
5. Close the inspector's test connection 118 to cause the residential domestic automatic shutoff valve 10 to automatically reset.
6. Open the domestic control valve 110.
7. Completely open at least three water outlets in the domestic piping system 102 and allow them to simultaneously flow.

If the domestic water outlets flow full, the residential domestic automatic shutoff valve 10 is set and ready for service and the water outlets on the domestic piping system 102 may be closed.

If the domestic water outlets do not flow full, re-close the domestic control valve 10, wait a minimum of five seconds, and ensure that there is no flow from the fire protection sprinkler piping system 104. Reopen the domestic control valve 110 and then recheck that the domestic water outlets are flowing full.

Flow through the residential domestic automatic shutoff valve 10 of the invention is tested by the following procedure:

1. Completely open the drain and flow test connection 116.
2. While water is flowing, record the pressure reading on the fire protection sprinkler piping system pressure gauge 120 and then compare this reading to previous readings. If there is significant decrease in pressure since the last time the pressure reading was taken which is not due to a normally expected drop in the water supply pressure, there may be an impairment that should be immediately identified and corrected.
3. Close the drain and flow test connection 116 to cause the residential domestic automatic shutoff valve 10 to automatically reset.
4. Completely open at least three water outlets in the domestic piping system 102 and allow them to simultaneously flow.

If the domestic water outlets flow full, the residential domestic automatic shutoff valve 10 is set and ready for service and the water outlets on the domestic piping system 102 may be closed.

If the domestic water outlets do not flow full, re-close the domestic control valve 110 and verify that there is no flow from the fire protection sprinkler piping system 104 (such as at the inspector's test connection 118). Wait a minimum of five seconds. Reopen the domestic control valve 110 and then recheck that the domestic water outlets are flowing full.

A number of embodiments of the invention have been described. Nevertheless, it will be understood that various modifications may be made without departing from the spirit and scope of the invention. For example, flow of water through the interconnecting passageway between the first, ancillary outlet and the second, fire protection outlet may be restricted by at least a region of minimum clearance between the opposing outer surface of the piston and the inner surface of the valve body, said minimum surface being relatively small compared to the areas of the first, ancillary outlet and the second, fire protection outlet, the region of minimum clearance extending along the piston axis in a region of a fixed distance equal to or greater than the axial length of the radial piston outlets. Accordingly, other embodiments are within the scope of the following claims.

What is claimed is:

1. An automatic water supply shutoff valve for use in connection with fire protection water supply piping system, said automatic water supply shutoff valve comprising:

a valve body defining a cavity in communication among a supply inlet for connection to a supply of water, a first, ancillary outlet for connection to ancillary supply piping, and a second, fire protection outlet for connection to fire protection piping; and a piston disposed within said cavity and defining a piston passageway, said piston being mounted for movement between a first position with said piston passageway connecting said supply inlet with said first, ancillary outlet, for flow of water therebetween, and a second position with said piston passageway connecting said supply inlet with said second, fire protection outlet, for flow of water therebetween, movement of said piston between said first position and said second position being responsive to biasing forces acting against said piston, said biasing forces comprising a first biasing force from said supply inlet acting over a first surface area of said piston, a second biasing force from said fire protection outlet acting over a second surface area of said piston, and a third biasing force acting against said piston, said first biasing force, urging said piston toward its second position, being opposed by a combination of said second biasing force and said third biasing force, together urging said piston toward its first position, said piston defining a piston inlet in communication between said supply inlet and said piston passageway and a plurality of radial piston outlets, in said first position, in communication between said piston passageway and said first, ancillary outlet and, in said second position, in communication between said piston passageway and said second, fire protection outlet.

2. The automatic water supply shutoff valve of claim 1, wherein said third biasing force comprises gravity.

3. The automatic water supply shutoff valve of claim 1 or 2, wherein said valve comprises a compression spring engaged between said piston and said body, said third biasing force comprising a spring force applied against said piston by said compression spring.

4. The automatic water supply shutoff valve of claim 1, said valve further comprising means for restricting flow between said first, ancillary outlet and said second, fire protection outlet.

5. The automatic water supply shutoff valve of claim 1, wherein said first surface area of said piston and said second surface area of said piston are substantially equal.

6. The automatic water supply shutoff valve of claim 1, wherein said piston has a cylindrical shape and said first surface area of said piston is equal to or greater than a cross-sectional area of said piston taken on a plane perpendicular to said axis of said piston.

7. The automatic water supply shutoff valve of claim 1, wherein said piston has a cylindrical shape and said second surface area of said piston is equal to or greater than a cross-sectional area of said piston taken on a plane perpendicular to said axis of said piston.

8. The automatic water supply shutoff valve of claim 1, wherein said first direction of movement of said piston and said second direction of movement of said piston are opposite directions along a cylindrical axis of said piston.

9. The automatic water supply shutoff valve of claim 1, wherein an interconnecting passageway between said first, ancillary outlet and said second, fire protection outlet is defined between an outer surface of said piston and an opposed inner surface of said valve body.

10. The automatic water supply shutoff valve of claim 9, wherein flow of water through said interconnecting passageway is restricted by at least a minimum clearance between said outer surface of said piston and said opposed inner surface of said valve body, said minimum clearance being relatively small compared to the areas of said first, ancillary outlet and said second, fire protection outlet.

11. The automatic water supply shutoff valve of claim 10, wherein said minimum clearance extends along said axis of said piston in a region of a fixed distance equal to or greater than the axial length of said radial piston outlets.

12. The automatic water supply shutoff valve of claim 11, wherein said piston is disposed for movement to an intermediate position, between said first position and said second position, for resisting flow from said supply inlet toward said first, ancillary outlet and for resisting flow from said supply inlet toward said second, fire protection outlet, and, said minimum clearance, with said piston in said intermediate position and said radial piston outlets positioned within said region of fixed distance, resists flow from said radial piston outlets toward said first, ancillary outlet and toward said second, fire protection outlet.

13. The automatic water supply shutoff valve of claim 9, wherein flow of water through said interconnecting passageway is restricted by at least a first annular seal engaged between said outer surface of said piston and said opposed inner surface of said valve body.

14. The automatic water supply shutoff valve of claim 13, wherein flow of water through said interconnecting passageway is restricted by a first annular seal and by a second annular seal engaged between said outer surface of said piston and said opposed inner surface of said valve body, said first annular seal and said second annular seal being spaced apart along said axis of said piston.

15. The automatic water supply shutoff valve of claim 14, wherein said first annular seal and said second annular seal are spaced apart along said axis of said piston and define a region of fixed distance equal to or greater than the axial length of said radial piston outlets.

16. The automatic water supply shutoff valve of claim 15, wherein said piston is disposed for movement to an intermediate position, between said first position and said second position, for resisting flow from said supply inlet toward said first, ancillary outlet and for resisting flow from said supply inlet toward said second, fire protection outlet, and said first annular seal and said second annular seal cooperate, with said piston in said intermediate position and said radial piston outlets positioned between said first annular seal and said second annular seal and within said region of fixed distance, to resist flow from said radial piston outlets toward said first, ancillary outlet and toward said second, fire protection outlet.

17. The automatic water supply shutoff valve of claim 13, 14, 15, or 16, wherein said annular seals comprise u-shape seals.

18. The automatic water supply shutoff valve of claim 1, wherein said fire protection outlet is connected to a fire protection sprinkler piping system with one or more fire protection sprinklers, the fire protection sprinkler piping system having a standby (static) condition closed to flow from said first, sprinkler outlet and an active condition open to flow from said first, sprinkler outlet, said active condition providing a flow from said first, fire protection outlet.

19. The automatic water supply shutoff valve of claim 18, wherein said piston is responsive to change of said fire sprinkler piping system from said static condition to said active condition to move from said first position toward said second position.

20. The automatic water supply shutoff valve of claim 19, wherein reduced pressure in said fire sprinkler piping system resulting from a single sprinkler flow reduces said second biasing force allowing said piston to move toward said second position.

21. The automatic water supply shutoff valve of claim 18, wherein said piston returns to said first position when said fire protection sprinkler system returns to said static condition.

22. The automatic water supply shutoff valve of claim 1, wherein said piston and said body, in said first position of said piston, together define a first generally circumferential ancillary flow passageway in communication between said plurality of radial piston outlets and said first, ancillary outlet, and said piston and said body, in said second position of said piston, together define a second generally circumferential fire protection flow passageway in communication between said plurality of radial piston outlets and said second, fire protection outlet.

23. The automatic water supply shutoff valve of claim 1, wherein said piston moves from said first position toward said second position in response to a differential of pressure between said supply inlet and said first, fire protection outlet of approximately 2 psi minus the weight of said piston.

* * * * *